(12) United States Patent
Fukushima

(10) Patent No.: US 10,540,127 B2
(45) Date of Patent: Jan. 21, 2020

(54) INFORMATION PROCESSING APPARATUS INSTALLING/UNINSTALLING PRINTER DRIVER FOR PERFORMING REMOTE SUPPORT FOR PRINTING DATA BY A SECOND INFORMATION PROCESSING APPARATUS VIA A RELAY APPARATUS

(71) Applicant: CANON KABUSHIKI KAISHA, Tokyo (JP)

(72) Inventor: Kenta Fukushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/113,674

(22) Filed: Aug. 27, 2018

(65) Prior Publication Data
US 2019/0073166 A1    Mar. 7, 2019

(30) Foreign Application Priority Data

Sep. 4, 2017   (JP) .................................. 2017-169604

(51) Int. Cl.
G06F 3/12    (2006.01)
H04N 1/00    (2006.01)

(52) U.S. Cl.
CPC ............ *G06F 3/1225* (2013.01); *G06F 3/121* (2013.01); *G06F 3/1285* (2013.01); *H04N 1/00344* (2013.01); *H04N 1/00938* (2013.01); *H04N 2201/0094* (2013.01)

(58) Field of Classification Search
CPC ...... G06F 3/1225; G06F 3/121; G06F 3/1285; H04N 1/00209; H04N 1/00344; H04N 1/00938; H04N 2201/0094
USPC ................................. 358/1.1–1.18, 402, 474
See application file for complete search history.

(56) References Cited

U.S. PATENT DOCUMENTS

| | | | | |
|---|---|---|---|---|
| 6,813,670 | B1 * | 11/2004 | Yao ....................... | G06F 9/4411 710/302 |
| 2006/0053194 | A1 * | 3/2006 | Schneider ........... | H04L 12/1827 709/204 |
| 2006/0200517 | A1 | 9/2006 | Nelson | |
| 2017/0324877 | A1 * | 11/2017 | Tokuchi ............. | H04N 1/00251 |
| 2018/0332182 | A1 * | 11/2018 | Fukasawa .......... | H04N 1/00344 |

FOREIGN PATENT DOCUMENTS

JP    2006-244504    9/2006

* cited by examiner

*Primary Examiner* — Gabriel I Garcia
(74) *Attorney, Agent, or Firm* — Venable LLP

(57) ABSTRACT

A communication processor of a user PC establishes a connection with a relay server to receive remote support by an operator PC, and installs in the user PC a printer driver for performing a print instruction to a printer driver of the operator PC from the user PC. The communication processor of the user PC transmits, via the relay server, print data generated by the printer driver of the user PC to the operator PC, for printing by the printer driver of the operator PC. The communication processor of the user PC uninstalls the printer driver from the user PC in accordance with the connection with the relay server being disconnected.

7 Claims, 12 Drawing Sheets

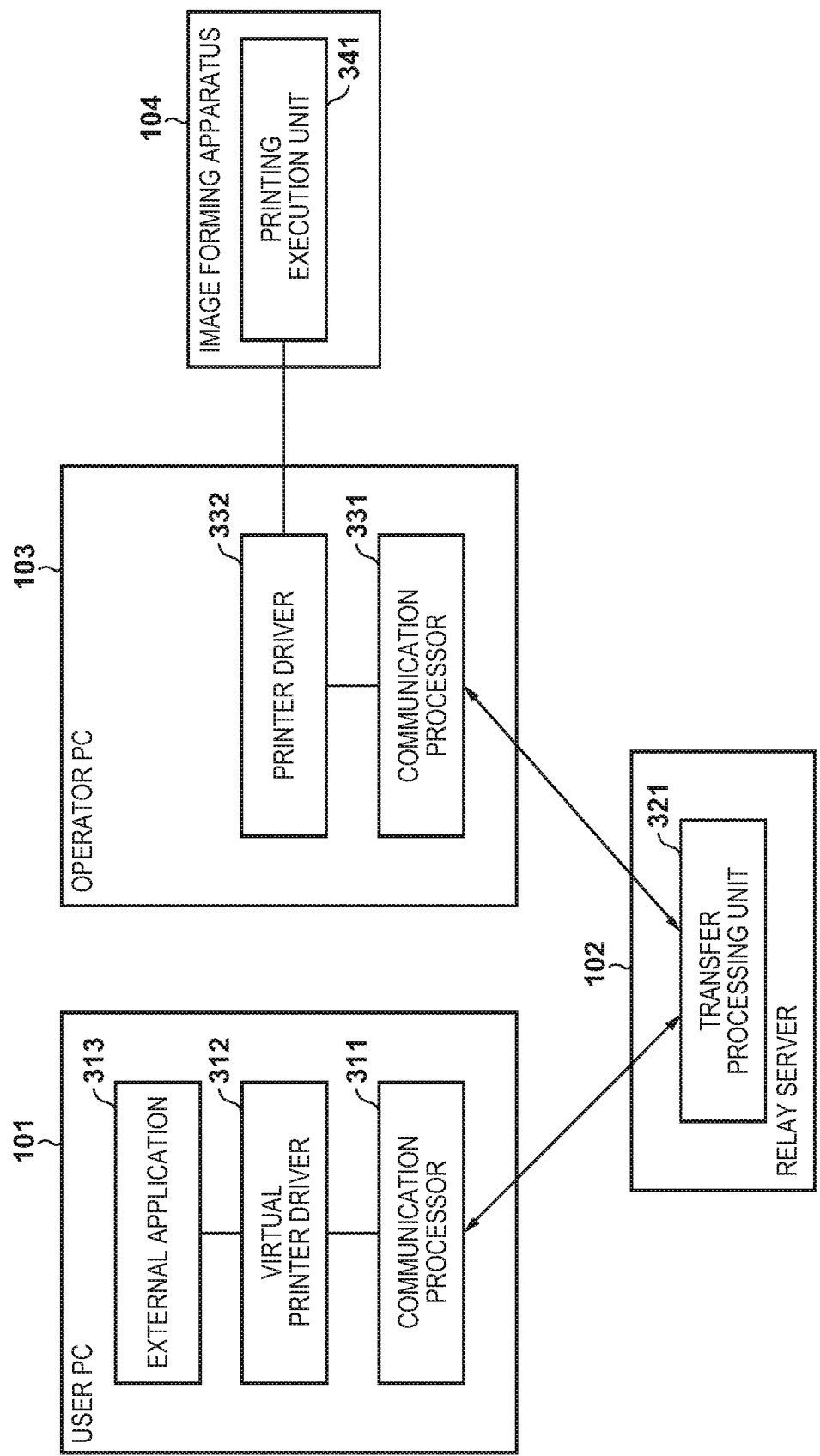

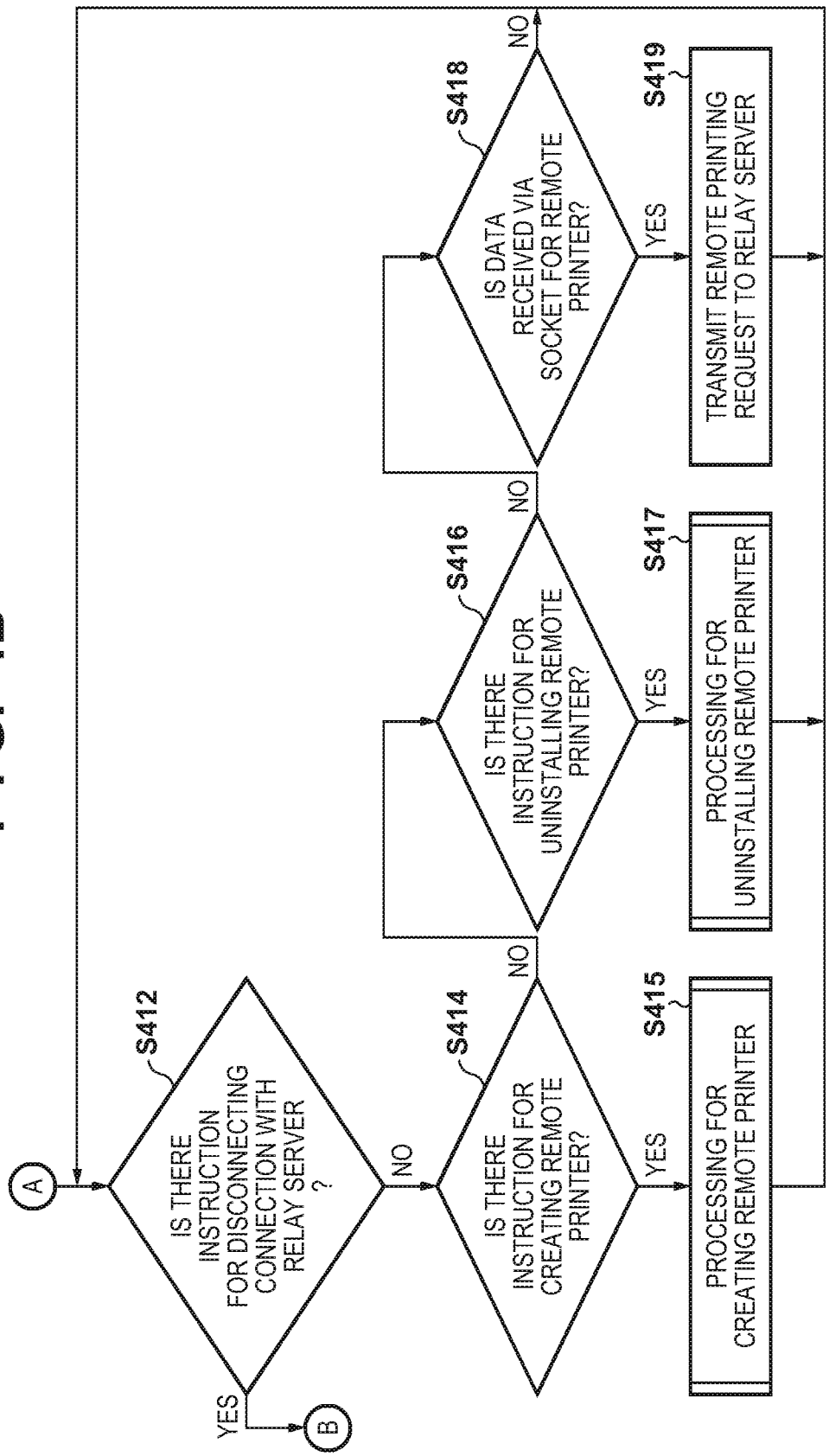

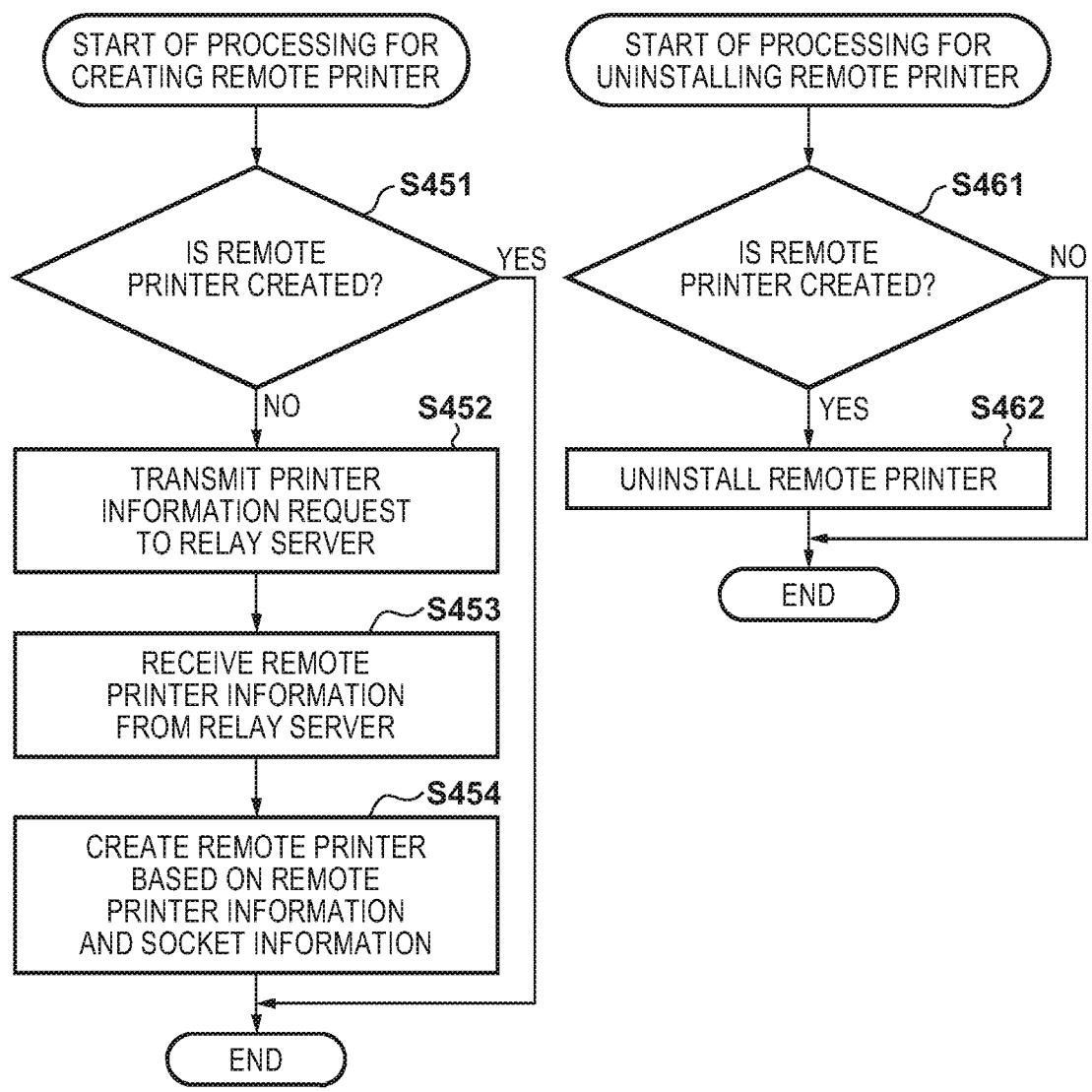

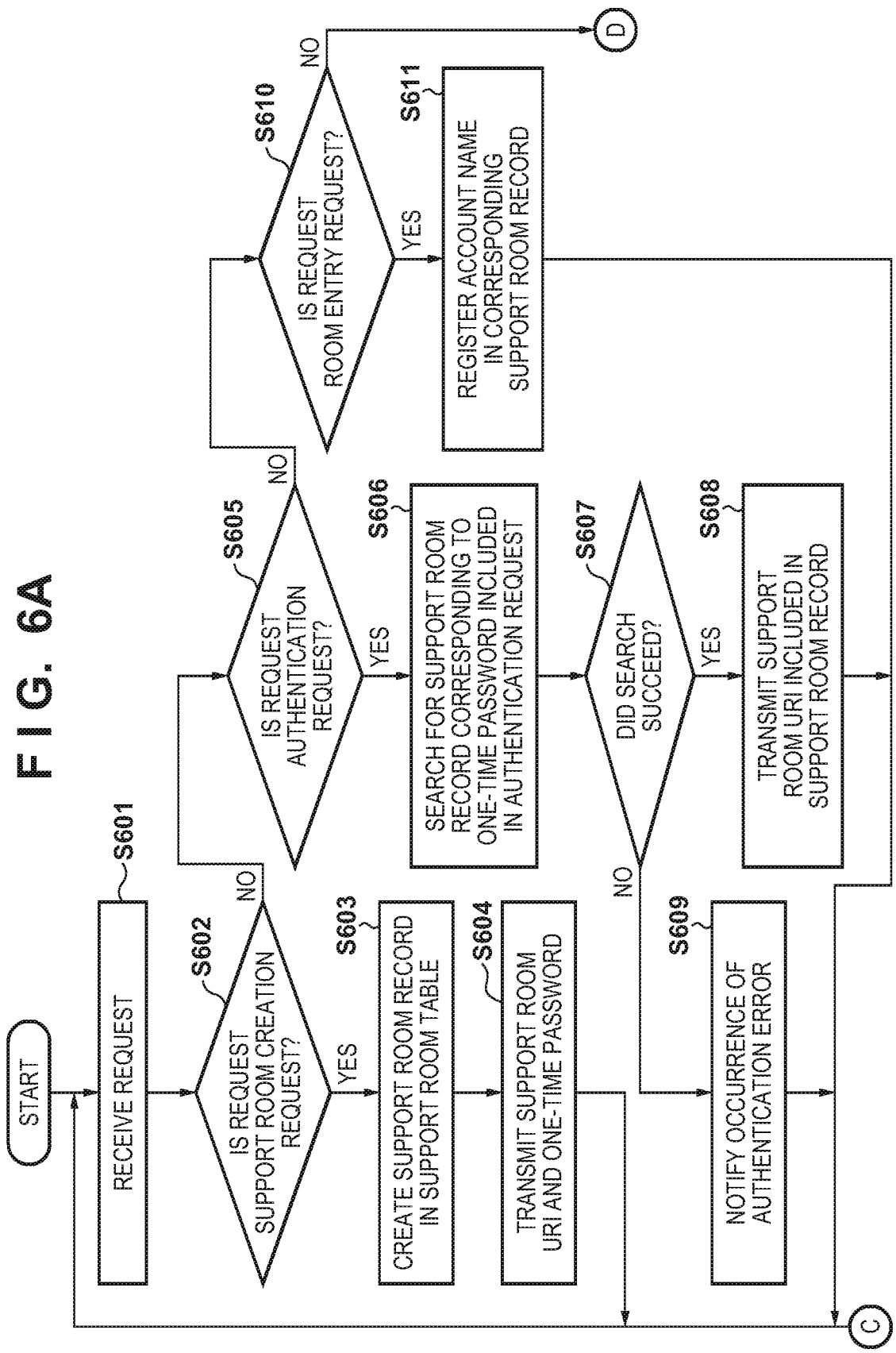

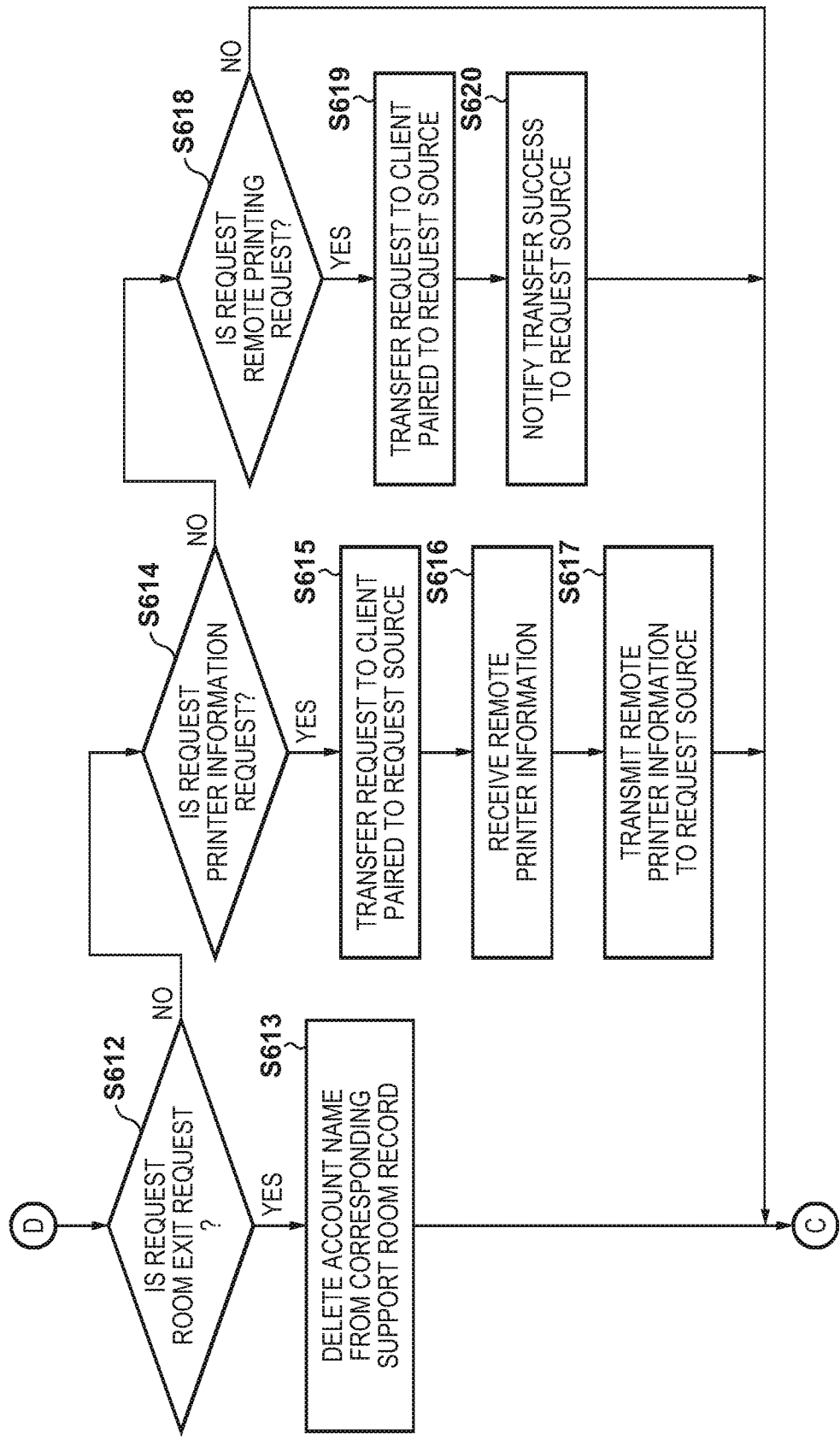

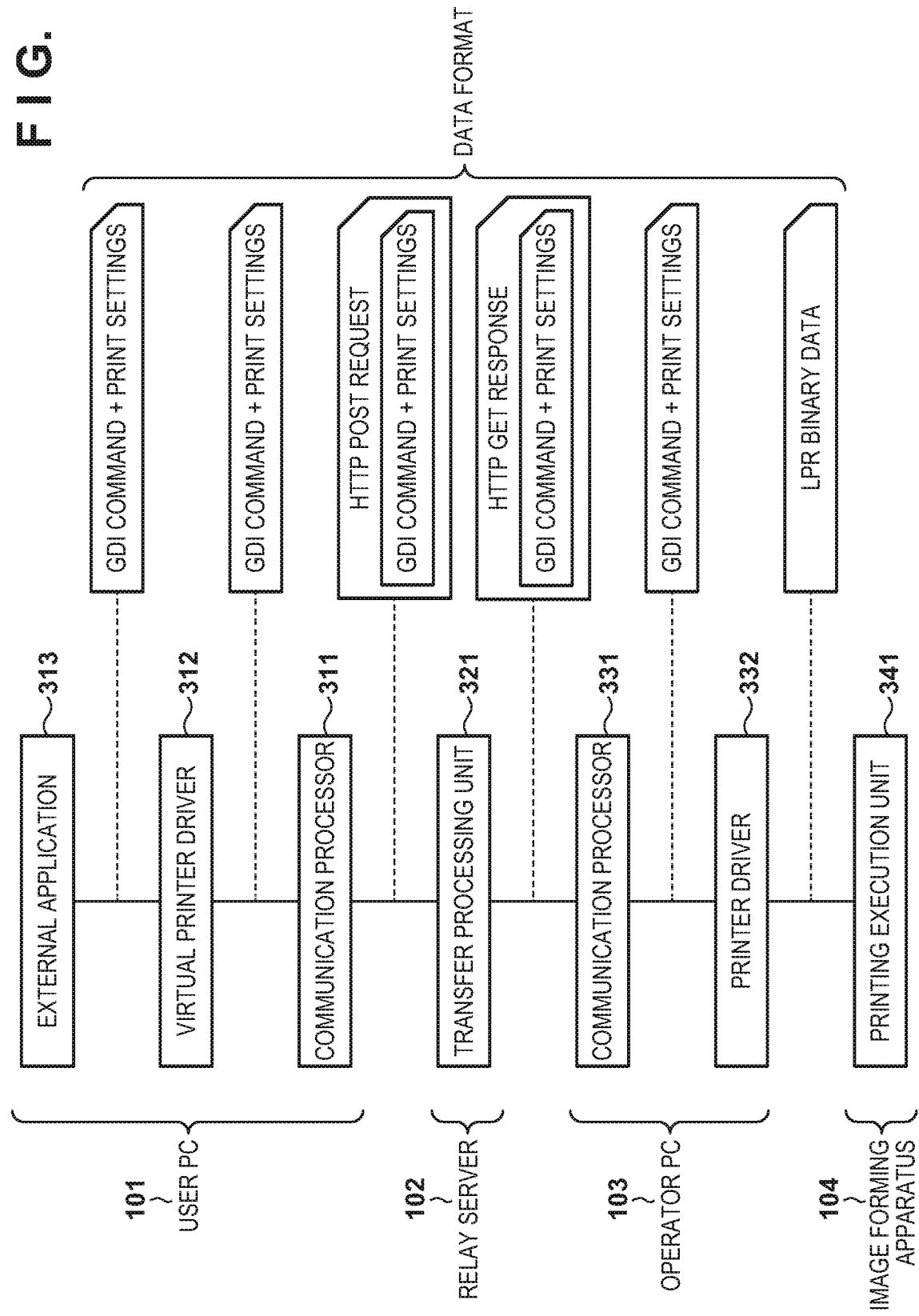

INFORMATION PROCESSING APPARATUS INSTALLING/UNINSTALLING PRINTER DRIVER FOR PERFORMING REMOTE SUPPORT FOR PRINTING DATA BY A SECOND INFORMATION PROCESSING APPARATUS VIA A RELAY APPARATUS

BACKGROUND OF THE INVENTION

Field of the Invention

The present invention relates to an information processing apparatus, a method for the information processing apparatus, and a storage medium.

Description of the Related Art

In recent years, remote maintenance services by audio and moving image communication and remote operation in an image processing apparatus such as a multifunction peripheral (MFP) have been proposed. In the remote maintenance service, when an error occurs in the multifunction peripheral, it is possible to resolve the error by an operator of a call center directly conveying how to solve the error to a user by audio and moving image communication, or by the operator of the call center remotely operating the multifunction peripheral. By this, a shortening of the time necessary to solve an error is possible without it being necessary for a worker to go to a site for maintenance.

With such a remote maintenance service, in many cases it is difficult to establish a direct session between an information terminal of a call center (a PC) and an information terminal in a user environment (a multifunction peripheral or a PC) due to a firewall (FW) installed in the office. Accordingly, a technique for establishing a session between information terminals by using HTTP (Hypertext Transfer Protocol) has been proposed. Typically, while a connection from the Internet to an information terminal inside a FW is restricted, a connection by HTTP to the Internet from an information terminal inside a FW is permitted. By using characteristics of such a connection by HTTP and respectively connecting two information terminals to a session management server (a relay server) that can be connected to as an HTTP client, it is possible to establish a session between the information terminals via the relay server.

With the remote maintenance service described above, there are cases of handling trouble where a defective image is printed (outputted) by a multifunction peripheral when a printer driver in a user environment is used to instruct execution of printing to the multifunction peripheral from a PC. In such a case, at the call center that provides the remote maintenance service, it can be necessary to confirm the print data used for the printing by the multifunction peripheral in the user environment. As a technique for realizing such printing, Japanese Patent Laid-Open No. 2006-244504 proposes a technique for transmitting document data between remote apparatuses connected via a media server to thereby have a side that receives the document data print the document.

With the conventional technique described above, after a printer driver for remote support is used to cause printing to be executed on an image forming apparatus in the call center from a PC in the user environment, there may be cases where the user or the operator forgets to uninstall the printer driver from the PC. However, when the printer driver for remote support continues to remain on the PC in the user environment after the end of remote support, there is the possibility of the user mistakenly operating the printer driver.

SUMMARY OF THE INVENTION

The present invention was conceived in view of the above described issues. The present invention provides a technique for, in a remote support system, preventing a printer driver for remote support installed in an information processing apparatus of a user environment (a PC) from continuing to remain on the information processing apparatus after the end of remote support.

According to one aspect of the present invention, there is provided a first information processing apparatus operable to communicate, via a relay server, with a second information processing apparatus operable to perform remote support of an apparatus, the first information processing apparatus comprising: a memory storing instructions; and a processor executing the instructions causing the first information processing apparatus to: establish a connection with the relay server to receive the remote support by the second information processing apparatus; install on the first information processing apparatus a first printer driver for transmitting, from the first information processing apparatus, data to be a print target of a second printer driver of the second information processing apparatus; transmit data generated by the first printer driver to the second information processing apparatus via the relay server; and uninstall the first printer driver from the first information processing apparatus, in accordance with the connection with the relay server being disconnected.

According to one aspect of the present invention, there is provided a method in a first information processing apparatus operable to communicate, via a relay server, with a second information processing apparatus operable to perform remote support of an apparatus, the method comprising: establishing a connection with the relay server to receive the remote support by the second information processing apparatus; installing on the first information processing apparatus a first printer driver for transmitting, from the first information processing apparatus, data to be a print target of a second printer driver of the second information processing apparatus; transmitting data generated by the first printer driver to the second information processing apparatus via the relay server; and uninstalling the first printer driver from the first information processing apparatus, in accordance with the connection with the relay server being disconnected.

According to still another aspect of the present invention, there is provided a non-transitory computer readable storage medium on which is stored a computer program for making a computer execute a method in a first information processing apparatus operable to communicate, via a relay server, with a second information processing apparatus operable to perform remote support of an apparatus, the method comprising: establishing a connection with the relay server to receive the remote support by the second information processing apparatus; installing on the first information processing apparatus a first printer driver for transmitting, from the first information processing apparatus, data to be a print target of a second printer driver of the second information processing apparatus; transmitting data generated by the first printer driver to the second information processing apparatus via the relay server; and uninstalling the first printer driver from the first information processing apparatus, in accordance with the connection with the relay server being disconnected.

By virtue of the present invention, it is possible to, in a remote support system, prevent a printer driver for remote support installed in an information processing apparatus of a user environment from continuing to remain in the information processing apparatus after the end of remote support.

Further features of the present invention will become apparent from the following description of exemplary embodiments (with reference to the attached drawings).

BRIEF DESCRIPTION OF THE DRAWINGS

FIG. 3 is a block diagram illustrating an example of a software configuration of the remote support system.

FIGS. 4A through 4D are flowcharts for illustrating a procedure for processing in a user PC.

FIGS. 6A and 6B are flowcharts for illustrating a procedure for processing in a relay server.

FIG. 8 illustrates an example of the transfer of data when printing is executed in the remote support system, and a format of the data transferred.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Network Configuration of Remote Support System>

Figure 1:
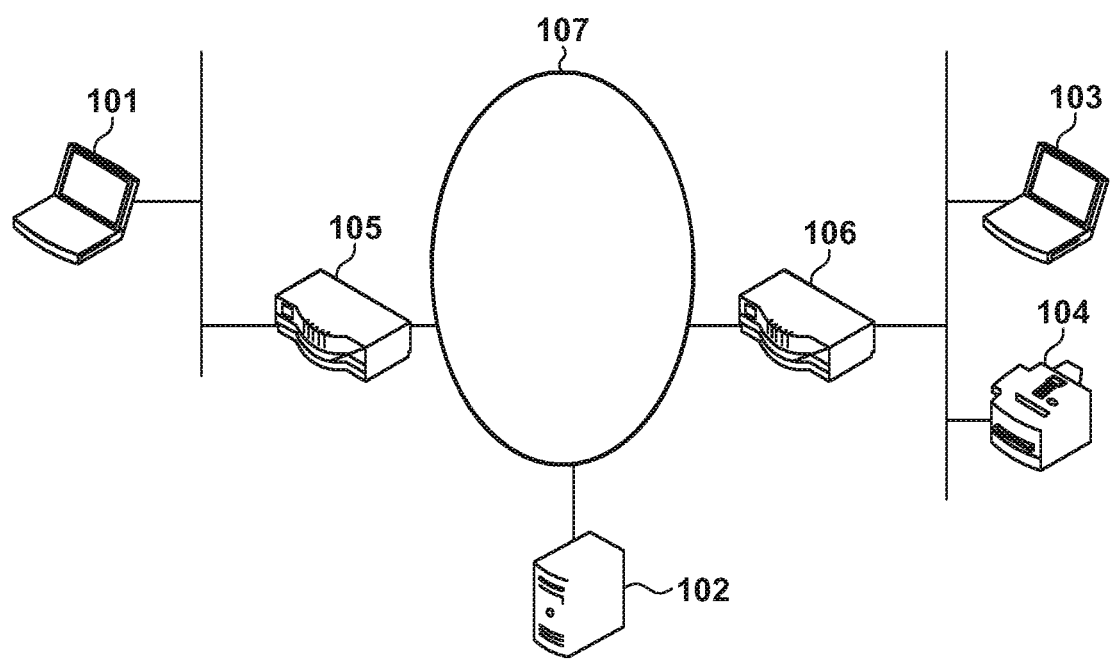
FIG. 1 illustrates a network configuration example of a remote support system.

FIG. 1 illustrates a network configuration example of a remote support system according to an embodiment. In the remote support system (communication system) illustrated in FIG. 1, a user PC 101 in a user environment is connected to a network 107 through a firewall (FW) 105. In addition, an operator PC 103 in a call center is connected to the network 107 through a FW 106. A relay server 102 is also connected to the network 107. The user PC 101 and the operator PC 103 are provided with a data communication function for performing data communication by executing call control in accordance with HTTP. In the present embodiment, the operator PC 103 performs remote support of the user PC 101 by communicating with the user PC 101 via the relay server 102. In this way, the remote support system of the present embodiment is a communication system where the user PC 101 (a first information processing apparatus) and the operator PC 103 (a second information processing apparatus) for performing remote support of the user PC 101 communicate via the relay server 102.

In data communication by HTTP, client nodes performs data communication with each other by performing POST/GET with respect to a URI (Uniform Resource Identifier) provided by a relay server (the relay server 102 in the present embodiment). By this, the client nodes can perform data communication with each other even if they are blocked by a private address area or an FW. In the present embodiment, the user PC 101 and the operator PC 103 operate as such HTTP client nodes.

Not just the operator PC 103, an image forming apparatus 104 is connected to the network (LAN) in the call center, which is separated from the network 107 by the FW 106. The image forming apparatus 104 is provided with a function for receiving a print command from the operator PC 103 by LPR (Line PRinter daemon protocol), and a function for performing printing of an image on a sheet (a print material or the like) in accordance with a received print command.

Note that, in the present embodiment, although a network configuration in which each client node performs communication after being connected to the network 107 via an FW is used, a network configuration in which each client node is connected to the network 107 without going through an FW may be used. In addition, any number of user PCs, FWs, image forming apparatuses, and operator PCs can be connected to the network 107. Furthermore, in communication between the user PC 101 and the operator PC 103, a communication protocol other than HTTP may be used, and in communication between the operator PC 103 and the image forming apparatus 104, a communication protocol other than LPR may be used.

<Hardware Configuration of Remote Support System>

Figure 2:
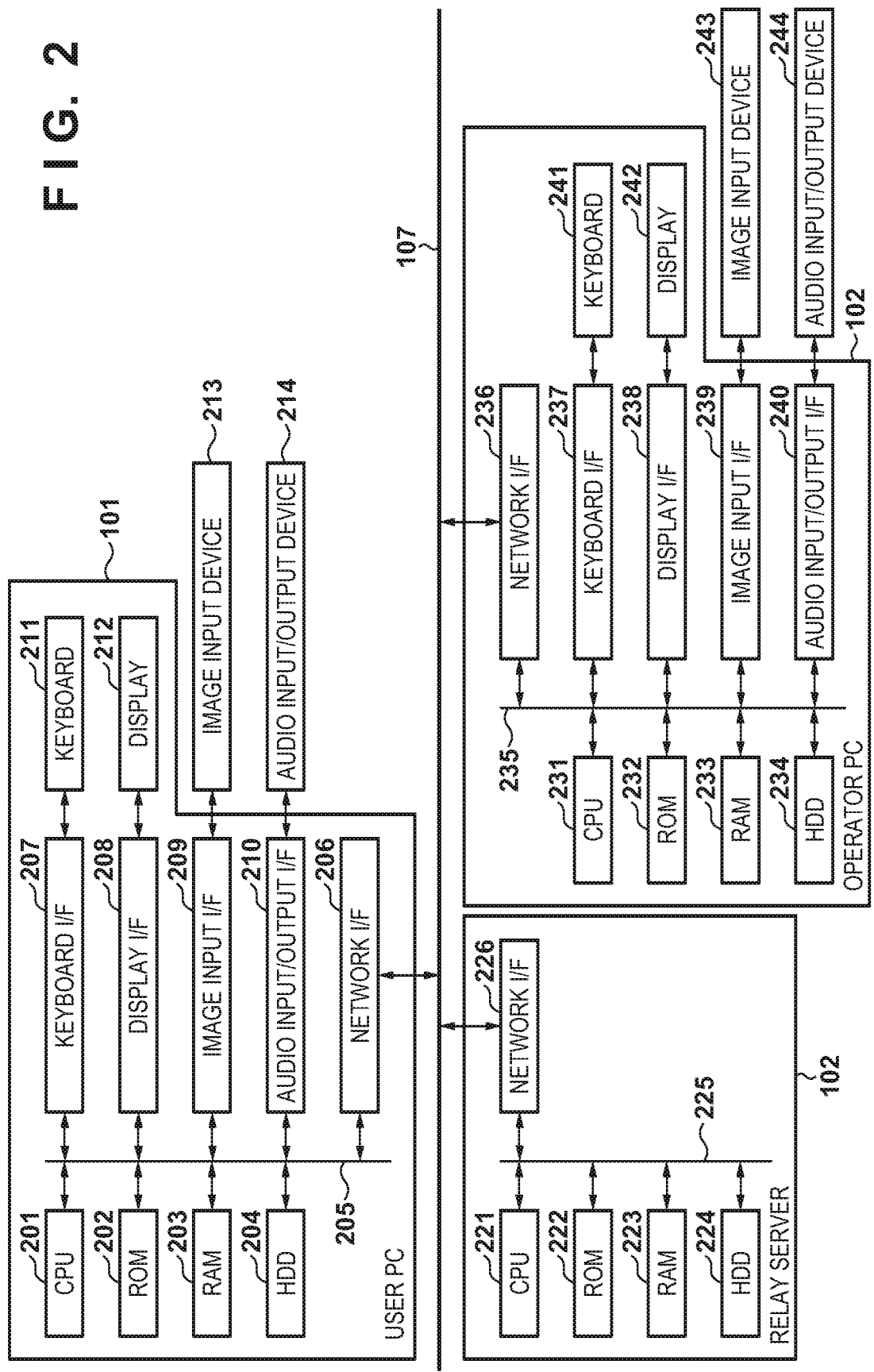
FIG. 2 is a block diagram illustrating an example of a hardware configuration of the remote support system.

FIG. 2 is a block diagram illustrating an example of a hardware configuration of the remote support system according to the present embodiment. Note that the FWs 105 and 106 illustrated in FIG. 1 are omitted in FIG. 2.

In the user PC 101, a CPU 201 comprehensively controls access to various devices connected to a system bus 205, based on a control program stored in a ROM 202 or a hard disk (HDD) 204. The ROM 202 stores, for example, the control program that the CPU 201 can execute. A RAM 203 mainly functions as, for example, a work area or a main memory of the CPU 201, and is configured so that it is possible to expand a memory capacity in accordance with optional RAM connected to an expansion port (not shown). The HDD 204 stores a boot program, various types of applications, and various types of data such as font data, user files, and editing files. Note that an SD card, a flash memory, or the like may be used as an external storage device, in addition to the HDD 204.

A network I/F 206 is connected to an external network via a network cable, and performs data communication with an external apparatus via the external network. In the present embodiment, the network I/F 206 is connected to the network 107 via the FW 105. A keyboard I/F 207 controls key inputs from a keyboard 211 or a pointing device (not shown). A display I/F 208 controls display by a display 212. An image input I/F 209 controls input of images from an image input device 213 such as a camera or the like. An audio input/output I/F 210 controls audio input/output with an audio input/output device 214 such as a headset.

In the relay server 102, a CPU 221 comprehensively controls access to various devices connected to a system bus 225, based on a control program stored in a ROM 222 or an HDD 224. The ROM 222 stores control programs and the like that the CPU 221 can execute. A RAM 223 mainly functions as a main memory, a work area, or the like, of the CPU 221, and is configured such that a memory capacity can be extended by option RAM connected to an expansion port (not shown). The HDD 224 stores a boot program, various applications, font data, user files, and edit files. Note, an SD card, a flash memory, and the like may be used as an external storage device in addition to the HDD 224.

A network I/F 226 is connected to an external network via a network cable, and performs data communication with an external apparatus via the external network. In the present embodiment, the network I/F 226 is connected to the network 107.

In the operator PC 103, a CPU 231 comprehensively controls access to various devices connected to a system bus 235, based on a control program stored in a ROM 232 or an HDD 234. The ROM 232 stores control programs and the like that the CPU 231 can execute. A RAM 233 mainly functions as a main memory, a work area, or the like, of the CPU 231, and is configured such that a memory capacity can be extended by option RAM connected to an expansion port (not shown). The HDD 234 stores a boot program, various applications, font data, user files, and edit files. Note that an SD card, a flash memory, or the like may be used as an external storage device, in addition to the HDD 234.

A network I/F 236 is connected to an external network via a network cable, and performs data communication with an external apparatus via the external network. In the present embodiment, the network I/F 236 is connected to the network 107 via the FW 106. A keyboard I/F 237 controls key inputs from a keyboard 241 or a pointing device (not shown). A display I/F 238 controls display by a display 242. An image input I/F 239 controls input of images from an image input device 243 such as a camera or the like. An audio input/output I/F 240 controls audio input/output with an audio input/output device 244 such as a headset.

<Software Configuration of Remote Support System>

FIG. 3 is a block diagram illustrating an example of a software configuration of the remote support system according to the present embodiment. Note that FIG. 3 illustrates a state where a virtual printer driver 312 is already installed in the user PC 101.

The user PC 101 has a communication processor 311, the virtual printer driver 312, and an external application 313. The communication processor 311 performs a communication process with the relay server 102. The external application 313 has a function for executing printing, and is an application (software) provided as a common function of the user PC 101.

The virtual printer driver 312 is a printer driver corresponding to a printer that the external application 313 designates at a time of executing printing, and is a printer driver for performing a print instruction to a printer driver 332 of the operator PC 103. The virtual printer driver 312 has a function for transferring print data to the communication processor 311 upon receiving the print instruction from the external application 313.

The operator PC 103 has a communication processor 331 and the printer driver 332. The communication processor 331 performs a communication process with the relay server 102. The printer driver 332 has a function for causing the image forming apparatus 104 to execute printing. The printer driver 332 is an application (software) provided as a common function of the operator PC 103.

The relay server 102 has a transfer processing unit 321. The transfer processing unit 321 transfers (relays) communication between the user PC 101 and the operator PC 103. The image forming apparatus 104 has a printing execution unit 341. The printing execution unit 341, upon receiving a print command from the printer driver 332 of the operator PC 103, executes printing in accordance with the received print command.

<Operation Flow of Remote Support System>

Description is given regarding a flow of overall operation of the remote support system according to the present embodiment. In the remote support system, the user PC 101, the operator PC 103, and the relay server 102 respectively operate in the following order of (1) through (6).

(1) The user PC 101 and the operator PC 103 access (connect to) the relay server 102.

(2) The relay server 102 pairs two clients (the user PC 101 and the operator PC 103) to establish a session between the two clients. Note that pairing can be realized by any method, such as a method for performing pairing after accepting a common code (a number and/or a character string) from the two clients, for example.

(3) After the establishment of the session by the relay server 102, the user PC 101 generates (installs) the virtual printer driver 312 in accordance with a user operation.

(4) In the user PC 101, when a print instruction is performed from the external application 313 to the virtual printer driver 312, the print data generated by the virtual printer driver 312 is transferred to the operator PC 103 via the relay server 102.

(5) In the operator PC 103, the printer driver 332 causes the image forming apparatus 104 to execute printing based on the received print data.

(6) The user PC 101 and the operator PC 103 each disconnect their session with the relay server 102, and end the processing.

Here, FIG. 8 illustrates an example of the transfer of print data from the user PC 101 to the image forming apparatus 104 in the foregoing (4) and (5), and a format of the transferred data. A GDI (Graphics Device Interface) command is a Windows™ standard command for transferring data to a printer driver. In the present embodiment, print data is transferred from the external application 313 of the user PC 101 to the printer driver 332 of the operator PC 103 in accordance with a GDI command. The printer driver 332 transmits a print command by LPR to the printing execution unit 341 of the image forming apparatus 104, based on the received print data. The printing execution unit 341 executes printing in accordance with the received print command.

Below, with reference to FIG. 4A through FIG. 7, description is given in more detail regarding processing executed by the user PC 101, the relay server 102, and the operator PC 103.

<Processing Procedure of User PC 101 (Communication Processor)>

Figure 4A:
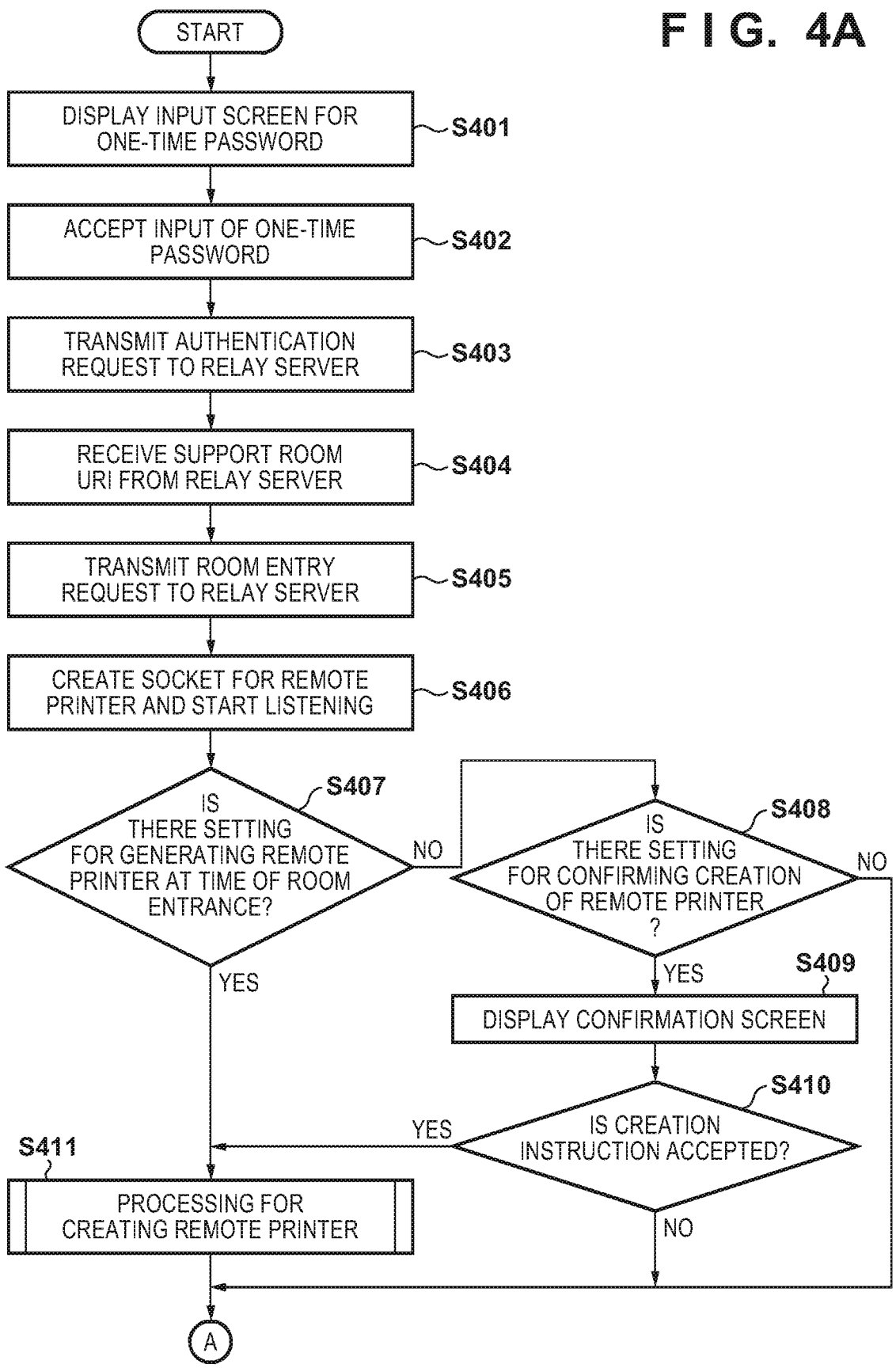
Figure 4C:
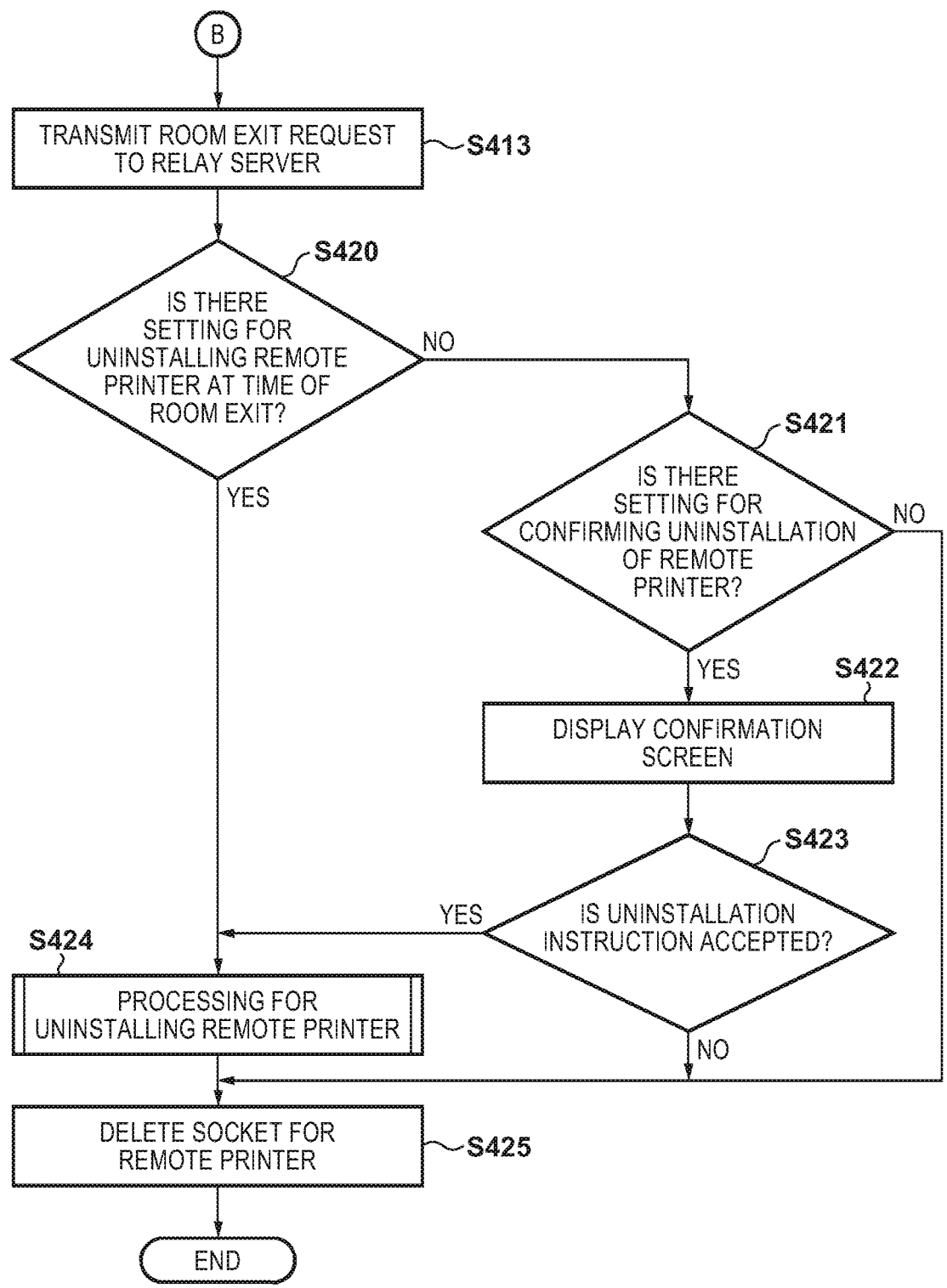

FIGS. 4A through 4C are flowcharts illustrating a procedure for processing by the communication processor 311 in the user PC 101. The processing of each step illustrated in FIGS. 4A through 4C is realized in the user PC 101 by the CPU 201 reading a program stored in the HDD 204 into the RAM 203, and executing the program. The processing in accordance with the procedure illustrated in FIGS. 4A through 4C is started in accordance with activation of the communication processor 311 (in other words, activation of a remote support application for realizing processing for receiving remote support), for example.

The CPU 201 (the communication processor 311), in step S401, displays a one-time password input screen on the display 212, and, in step S402, accepts input of a one-time password in the input screen from a user. In the remote support system of the present embodiment, a one-time password is used to enable access to the relay server 102 by the user PC 101. A user of the user PC 101 causes the user PC 101 to access the relay server 102 by using the keyboard 211 to input via the input screen a one-time password conveyed by an operator of the call center.

This one-time password is generated in association with a support room for remote support on the relay server 102 that is generated (step S603 of FIG. 6A) in accordance with a request from the operator PC 103 (step S701 of FIG. 7), as described later. This support room corresponds to a memory region in the relay server 102. The generated one-time password is transmitted to the operator PC 103 together with a support room URI (step S604 of FIG. 6A), and is displayed on the display 242 of the operator PC 103 (step S703 of FIG. 7). The operator of the call center conveys the one-time password displayed on the display 242 to the user by a means such as a telephone call or email. By this, the user can input the one-time password via the input screen, as described above.

When input of the one-time password completes, the CPU 201, in step S403, sets (stores) the inputted one-time password to a data field of an authentication request, and transmits the authentication request to the relay server 102. When authentication in the relay server 102 succeeds, the support room URI which is a transmission destination of a room entry request is transmitted from the relay server 102 (step S608 of FIG. 6A). Accordingly, after the transmission of the authentication request, the CPU 201, in step S404, receives the support room URI from the relay server 102.

Upon receiving the support room URI, in step S405, the CPU 201 transmits a room entry request for requesting entrance to the support room, to the support room URI received from the relay server 102. In accordance with this room entry request, the relay server 102 pairs (associates) the user PC 101 and the operator PC 103. Note that, as described later using FIGS. 6A and 6B, the relay server 102 adds an account corresponding to the user PC 101 to a support room record corresponding to the support room URI to thereby pair the user PC 101 with the operator PC 103 that entered the room first. By this, entrance of the user PC 103 to the support room on the relay server 102 completes (in other words, a connection with the relay server 102 is established), and the user PC 101 and the operator PC 103 can perform communication for remote support via the relay server 102.

Upon completion of entrance to the support room in step S405, the CPU 201, in step S406, creates a socket for the remote printer, and starts waiting for a connection (listening) on the socket. Here, the remote printer is a name for the virtual printer driver 312 which is a printer driver for remote support, and is included in a list of devices in the user PC 101. In step S406, a socket for receiving print data including image data and print settings from the virtual printer driver 312 (the remote printer) is created. Note that the created socket may be a TCP local loopback socket, or may be a file descriptor, for example.

Next, in step S407, the CPU 201 determines whether or not a setting for creating a remote printer at a time of entrance to the support room has been made. This setting is made by the remote support application in accordance with an instruction by a user, and corresponding setting data is saved in the HDD 204 in advance. Note that this setting is an example of a third setting for installing the virtual printer driver 312 when the connection with the relay server 102 is established. If this setting has been made, the CPU 201 advances the processing to step S411, and if this setting has not been made, the CPU 201 advances the processing to step S408.

In step S408, the CPU 201 determines whether or not a setting for confirming whether or not to create the remote printer when entering the support room has been made. This setting is made by the remote support application in accordance with an instruction by a user, and corresponding setting data is saved in the HDD 204 in advance. Note that this setting is an example of a fourth setting for confirming with a user whether or not to install the virtual printer driver 312 when the connection with the relay server 102 is established. If this setting has not been made, the CPU 201 advances the processing to step S412, and if this setting has been made, the CPU 201 advances the processing to step S409. In step S409, the CPU 201 displays on the display 212 a pop-up screen (a confirmation screen) for confirming whether or not to create a remote printer. After the display of the confirmation screen, the CPU 201 determines whether or not an instruction for creating the remote printer has been accepted from a user. If a creation instruction has been accepted, the CPU 201 advances the processing to step S411, and if a creation instruction has not been accepted, the CPU 201 advances the processing to step S412.

In step S411, the CPU 201 executes processing for creating the remote printer by the procedure illustrates in FIG. 4D. If processing for creating the remote printer starts, the CPU 201, in step S451, determines whether or not the remote printer has been created. Specifically, the CPU 201 searches for the remote printer from the list of devices saved in the HDD 204. Furthermore, if the remote printer is present in the list of devices, the CPU 201 determines that the remote printer has been created, and ends the processing for creating the remote printer. Meanwhile, if the remote printer is not present in the list of devices, the CPU 201 determines that the remote printer has not been created, and advances the processing to step S452.

In step S452, the CPU 201 transmits to the relay server 102 a printer information request for requesting remote printer information. The remote printer information is information relating to the printer driver of the operator PC 103. The remote printer information includes information indicating what kind of print setting can be performed by a user when the user instructs the execution of printing with respect to the remote printer in the user PC 101. The printer information request is transferred from the relay server 102 to the operator PC 103. Furthermore, as a response to the request, the remote printer information is transmitted from the operator PC 103 to the relay server 102, and is transferred from the relay server 102 to the user PC 101. As a result, in step S453, the CPU 201 receives the remote printer information from the relay server 102.

After receiving the remote printer information, in step S454, the CPU 201 creates the remote printer (in other words, installs the virtual printer driver 312) based on the received remote printer information and socket information relating to the socket for the remote printer. The socket for the remote printer is set as an output destination corresponding to the remote printer, for when outputting print data to the remote printer. Settings related to the created remote printer are saved in the HDD 204. Note that the created remote printer is added to the list of devices saved in the HDD 204. Subsequently, the CPU 201 ends the processing for creating the remote printer. In this way, if the third setting (step S407) described above has been made, the CPU 201 installs the virtual printer driver 312 when a connection with the relay server 102 is established.

Returning to the description of FIGS. 4A through 4C, when the processing for creating the remote printer ends, the CPU 201 advances the processing from step S411 to step S412. In step S412, step S414, step S416, and step S418, the CPU 201 enters a state of waiting for receipt of data via the socket for the remote printer, or receipt an instruction made by a user operating the keyboard 211 or the like.

In step S412, the CPU 201 determines whether or not it has accepted from a user an instruction for disconnecting the connection (session) with the relay server, and advances the processing to step S413 in a case of having accepting a disconnection instruction, and advances the processing to step S414 in a case of having not accepted a disconnection instruction. In step S414, the CPU 201 determines whether or not it has accepted an instruction to create a remote printer, and advances the processing to step S415 in a case of having accepting a creation instruction. In step S415, the CPU 201 executes processing (FIG. 4D) for creating the remote printer similarly to step S411, returns the processing to step S412, and enters a waiting state again. Meanwhile, in a case of having not accepted a creation instruction, the CPU 201 advances the processing from step S414 to step S416.

In step S416, the CPU 201 determines whether or not it has accepted an instruction for uninstalling the remote printer, and, in a case of having accepting an uninstallation instruction, advances the processing to step S417, and executes processing for uninstalling the remote printer by the procedure illustrated in FIG. 4D. If processing for uninstalling the remote printer starts, the CPU 201, in step S461, determines whether or not the remote printer has been created. Specifically, the CPU 201 searches for the remote printer from the list of devices saved in the HDD 204. Furthermore, if the remote printer is not present in the list of devices, the CPU 201 determines that the remote printer has not been created, and ends the processing for uninstalling the remote printer. Meanwhile, if the remote printer is present in the list of devices, the CPU 201 determines that the remote printer has been created, and advances the processing to step S462. In step S462, the CPU 201 uninstalls the remote printer from the list of devices saved in the HDD 204. Subsequently, the CPU 201 ends the processing for uninstalling the remote printer.

Returning to the description of FIGS. 4A through 4C, when the processing for uninstalling the remote printer ends, the CPU 201 returns the processing from step S417 to step S412, and enters a waiting state again. In addition, when no uninstall instruction is accepted in step S416, the CPU 201 advances the processing to step S418. In step S418, the CPU 201 determines whether or not print data outputted from the remote printer (the virtual printer driver 312) has been received via the socket for the remote printer. If no print data has been received, the CPU 201 returns the processing to step S412, and enters the waiting state again. Meanwhile, the CPU 201 advances the processing to step S419 in a case of having received print data. In step S419, the CPU 201 sets (stores) the received print data in a data field of a remote printing request, and transmits the request to the relay server. At least image data and print settings are included in this print data.

The remote printing request transmitted to the relay server 102 is transferred from the relay server 102 to the operator PC 103. As described below, the operator PC 103 uses the printer driver 332 to cause the image forming apparatus 104 to execute printing in accordance with the received remote printing request. When transmission of the remote printing request completes, the CPU 201 returns the processing to step S412, and enters the waiting state again.

In a case of having accepted an instruction for disconnecting the connection with the relay server 102 in step S412, the CPU 201, subsequently in step S413, transmits to the relay server 102 a room exit request for requesting an exit from the entered support room. In accordance with this room exit request, the account corresponding to the user PC 101 is deleted from the support room record held by the relay server 102, and the connection (session) between the user PC 101 and the relay server 102 is disconnected.

Next, in step S420, the CPU 201 determines whether or not a setting for uninstalling the remote printer at a time of exit from the support room has been made. This setting is made by the remote support application in accordance with an instruction by a user, and corresponding setting data is saved in the HDD 204 in advance. Note that this setting is an example of a first setting for uninstalling the virtual printer driver 312 when the connection with the relay server 102 is disconnected. If this setting has been made, the CPU 201 advances the processing to step S421, and if this setting has not been made, the CPU 201 advances the processing to step S424.

In step S421, the CPU 201 determines whether or not a setting for confirming whether or not to uninstall the remote printer when exiting the support room has been made. This setting is made by the remote support application in accordance with an instruction by a user, and corresponding setting data is saved in the HDD 204 in advance. Note that this setting is an example of a second setting for confirming with a user whether or not to uninstall the virtual printer driver 312 when the connection with the relay server 102 is disconnected. If the setting has not been made, the CPU 201 advances the processing to step S425, and if the setting has been made, the CPU 201 advances the processing to step S422. In step S422, the CPU 201 displays on the display 212 a pop-up screen (a confirmation screen) for confirming whether or not to uninstall the remote printer. After the display of the screen, the CPU 201 determines whether or not an instruction for uninstalling the remote printer has been accepted from a user. In a case of having accepted an uninstall instruction, the CPU 201 advances the processing to step S424, and advances the processing to step S425 in a case of having not accepted an uninstall instruction.

In step S424, the CPU 201 executes processing (FIG. 4D) for uninstalling the remote printer similarly to step S417, and advances the processing to step S425. In this way, if the first setting (step S420) described above is made, the CPU 201 uninstalls the virtual printer driver 312 in accordance with the disconnection from the relay server 102. In step S425, the CPU 201 deletes the socket for the remote printer that was created in step S406, and ends the processing.

<Processing Procedure for User PC 101 (Virtual Printer Driver)>

Figure 5:
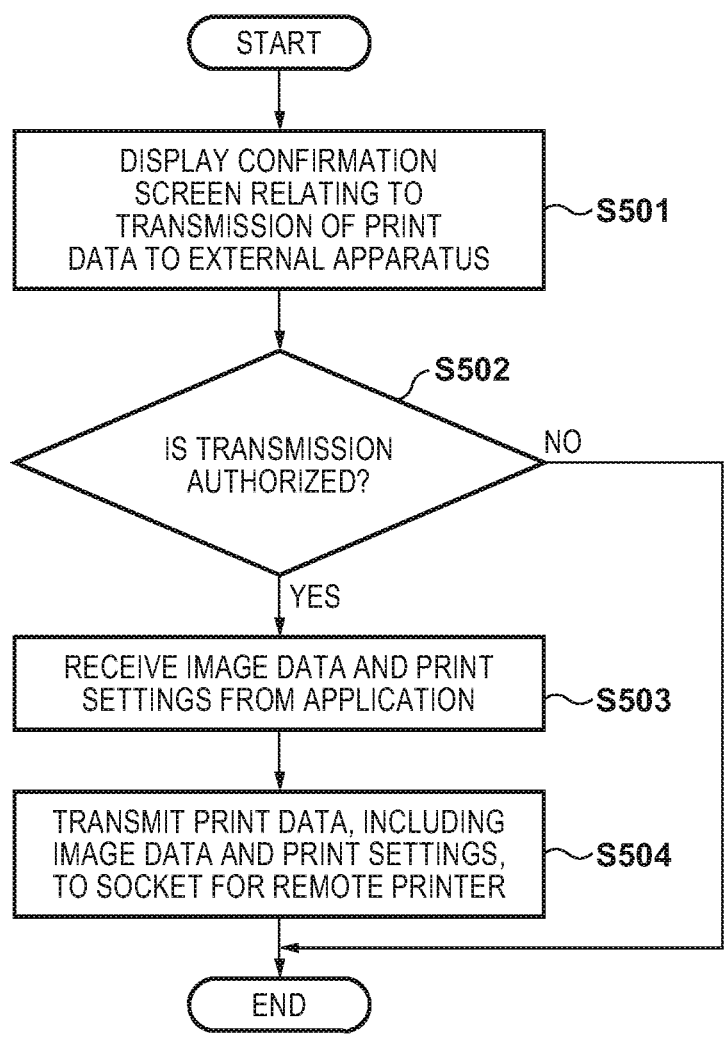
FIG. 5 is a flowchart for illustrating a procedure for processing in a user PC.

FIG. 5 is a flowchart illustrating a procedure for processing by the virtual printer driver 312 in the user PC 101. The processing of each step illustrated in FIG. 5 is realized in the user PC 101 by the CPU 201 reading a program stored in the HDD 204 into the RAM 203, and executing the program. The processing in accordance with the procedure illustrated in FIG. 5 is started when a print instruction from the external application 313 is made with respect to a remote printer (the virtual printer driver 312) created by processing for creating a remote printer (FIG. 4D), for example. Note that a print instruction is made to the remote printer (the virtual printer driver 312) from the external application 313 by a user operating the external application 313 to designate the remote printer as a printer for performing printing.

When the print instruction is made with respect to the remote printer, the CPU 201 (the virtual printer driver 312), in step S501, displays on the display 212 a confirmation screen for a user to confirm whether or not to permit (authorize) transmission of the print data to an external apparatus. Subsequently, in step S502, the CPU 201 accepts an operation by a user with respect to the keyboard 211 or the like, and determines whether or not transmission of the print data has been permitted by a user. The CPU 201 ends the processing if transmission of print data is not permitted, and advances the processing to step S503 if the transmission is permitted.

In step S503, the CPU 201 receives print settings and image data to be printed from the external application 313. Finally, in step S504, the CPU 201 generates print data that includes print settings and the image data to be printed, and outputs the print data to the communication processor 311 by transmitting the print data to the socket for the remote printer. Subsequently, the CPU 201 ends the processing in accordance with the procedure illustrated in FIG. 5.

<Processing Procedure of Relay Server 102>

FIGS. 6A and 6B are flowcharts illustrating a procedure for processing by the transfer processing unit 321 in the relay server 102. The processing of each step illustrated in FIGS. 6A and 6B is realized in the relay server 102 by the CPU 221 reading a program stored in the HDD 224 into the RAM 223, and executing the program.

Firstly, in step S601, the CPU 221 receives a request from a client. In the present embodiment, the client corresponds to the user PC 101 or the operator PC 103. Upon receiving a request, the CPU 221 determines a type of the received request in step S602, step S605, step S610, step S612, step S614, and in step S618. In a case where it is not possible to determine the type of a received request ("NO" in step S618), the CPU 221 returns the processing to step S601, and waits for a subsequent request.

If the request received in step S601 is a support room creation request ("YES" in step S602), the CPU 221 advances the processing to step S603. Note that the support room creation request is transmitted from a client operated by an operator (the operator PC 103). In step S603, the CPU 221 generates a new support room record in a support room table, and saves the support room table in the HDD 224. The following Table 1 illustrates an example of a support room table.

TABLE 1

Support Room Table

| Support Room ID | Support Room URI | One-time Password | Account List |
|---|---|---|---|
| 0001 | https://server.com/0001 | abcdefgh | |
| 0002 | https://server.com/0002 | 12345678 | sato |
| 0003 | https://server.com/0003 | abcd1234 | suzuki, takahashi |

Each row of the support room table indicates a support room record corresponding to a respectively different support room. Each support room record is configured by a support room ID, a support room URI, a one-time password, and an account list, as illustrated in Table 1. A support room ID is identification information of a corresponding support room. A support room URI is used to request the relay server 102 for entrance to a corresponding support room. A one-time password is used for access (transmission of an authentication request) to the relay server 102. An account list is a list of accounts who have entered a corresponding support room. Note that a support room record having a support room ID "0001" is an example of a support room record immediately after creation, and there are no accounts who have entered the support room.

After creation of the support room record, in step S604, the CPU 221 transmits the support room URI and the one-time password included in the created support room record, to the client that made the request. Subsequently, the CPU 221 returns the processing to step S601, and waits for a subsequent request.

If the request received in step S601 is authentication request ("YES" in step S605), the CPU 221 advances the processing to step S606. Note that the authentication request is transmitted from a client operated by a user (the user PC 101). In step S606, the CPU 221 obtains the one-time password included in the received request, and searches for the one-time password in the support room table. By this, a support room record corresponding to the one-time password is searched for. Next, in step S607, the CPU 221 determines whether or not the search for a support room record succeeded, and advances the processing to step S608 if the search succeeded. In step S608, the CPU 221 transmits the support room URI included in the found support room record to the client that made the request. Meanwhile, if the search failed in step S607, the CPU 221 advances the processing to step S609, and notifies the client that made the request of the occurrence of an authentication error. After the completion of the processing of step S608 or step S609, the CPU 221 returns the processing to step S601, and waits for a subsequent request.

If the request received in step S601 is a room entry request to enter the support room ("YES" in step S610), the CPU 221 advances the processing to step S611. Note that the room entry request is transmitted from a client operated by an operator (the operator PC 103), or a client operated by a user (the user PC 101). In step S611, the CPU 221 registers an account name corresponding to the client who made the request, in the account list of the support room record corresponding to the support room URI of a transmission destination of the room entry request. Note that there are cases where a plurality of account names are registered in the account list, as in the example illustrated in Table 1. By the processing of step S611, pairing of clients (the user PC 101 and the operator PC 103) with each other is possible. Subsequently, the CPU 221 returns the processing to step S601, and waits for a subsequent request.

If the request received in step S601 is a room exit request to exit the support room ("YES" in step S612), the CPU 221 advances the processing to step S613. Note that the room exit request is transmitted from a client operated by an operator (the operator PC 103), or a client operated by a user (the user PC 101). In step S613, the CPU 221 deletes the account name corresponding to the client who made the request, in the account list of the support room record corresponding to the support room URI of a transmission destination of the room exit request. By the processing of step S613, the pairing of clients (the user PC 101 and the operator PC 103) with each other is canceled. Subsequently, the CPU 221 returns the processing to step S601, and waits for a subsequent request.

If the request received in step S601 is a printer information request ("YES" in step S614), the CPU 221 advances the processing to step S615. Note that the printer information request is transmitted from a client operated by a user (the user PC 101). In step S615, the received printer information request is transferred to the other client (the operator PC 103) that is paired with the client that made the request (the user PC 101). Specifically, the client corresponding to the account other than the account that made the request is identified from the account list of the support room record corresponding to the support room URI of the transmission destination of the room entry request, and the printer information request is transmitted to the identified client. Note that push transmission from the relay server 102 to a client can be realized by using Long Polling, a Web Socket, or the like.

Next, in step S616, the CPU 221 receives, from the client that is the transfer destination of the printer information request (the operator PC 103), remote printer information as a response to the request. Furthermore, in step S617, the CPU 221 transmits the received remote printer information to the client that made the request. Subsequently, the CPU 221 returns the processing to step S601, and waits for a subsequent request.

If the request received in step S601 is a remote printing request ("YES" in step S618), the CPU 221 advances the processing to step S619. In step S619, the CPU 221 transfers the received remote printing request to the other client (the operator PC 103) that is paired with the client that made the request (the user PC 101). When the transfer for the request completes, the CPU 221, in step S620, notifies the client that made the request (the user PC 101) that transfer of the request succeeded. By the processing of step S618 through step S620, the print data, for which a print instruction is performed in the user PC 101, is transferred from the relay server 102 to the operator PC 103. Subsequently, the CPU 221 returns the processing to step S601, and waits for a subsequent request.

<Processing Procedure for Operator PC 103>

Figure 7:
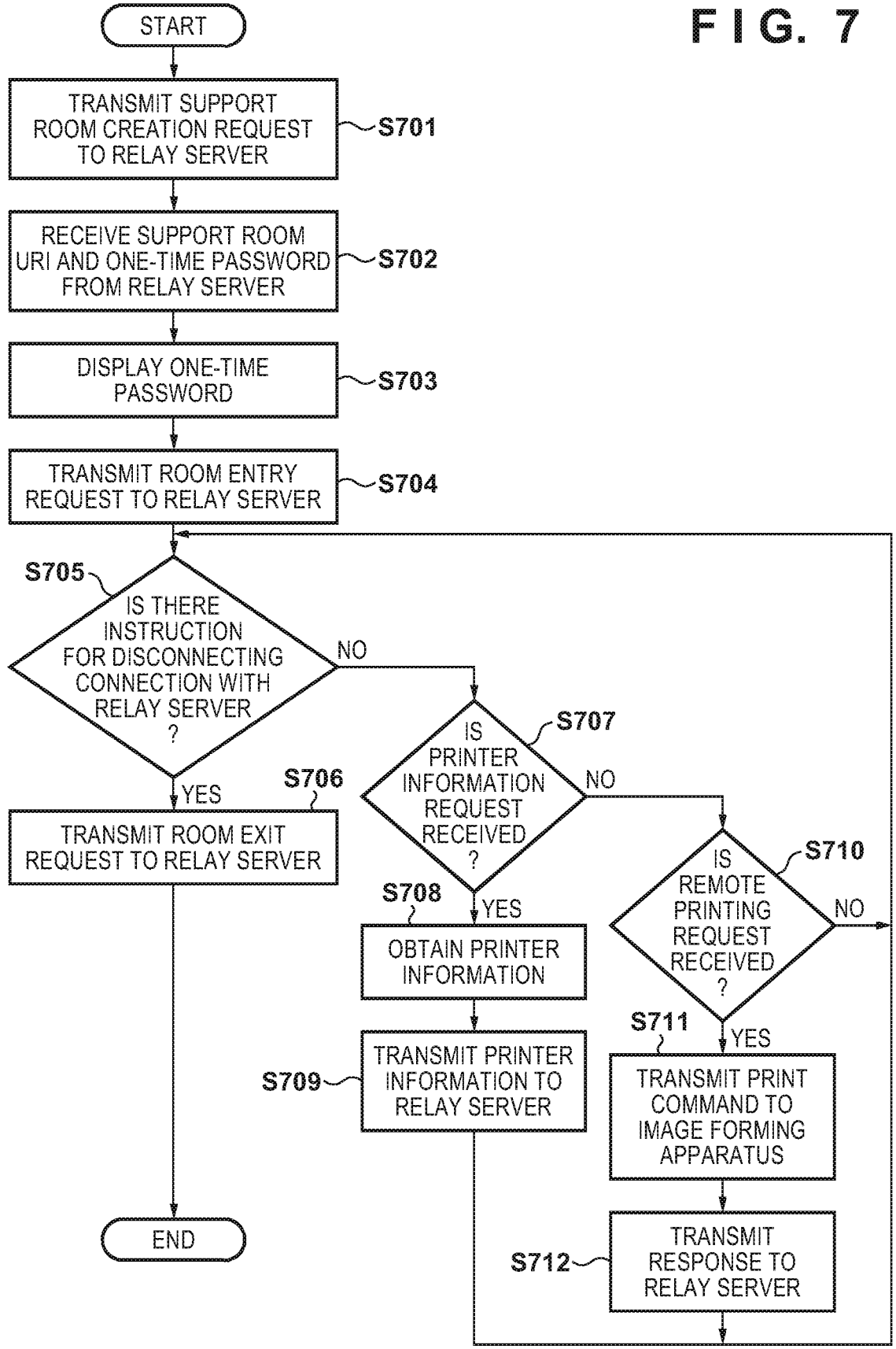
FIG. 7 is a flowchart for illustrating a procedure for processing in an operator PC.

FIG. 7 is a flowchart illustrating a procedure for processing by the communication processor 331 in the operator PC 103. The processing of each step illustrated in FIG. 7 is realized in the operator PC 103 by the CPU 231 reading a program stored in the HDD 234 into the RAM 233, and executing the program.

Firstly, in step S701, the CPU 231 transmits a support room creation request to the relay server 102. Next, in step S702, the CPU 231 receives a support room URI and a one-time password corresponding to a support room record transmitted from the relay server 102 (in step S604) as a response that corresponds to the request. If the reception completes, in step S703, the CPU 231 displays the received one-time password on the display 242. By the operator conveying the displayed one-time password to a user of the user PC 101 by a means such as a telephone call or email, the user can cause the user PC 101 to transmit an authentication request to the relay server 102. Subsequently, in step S704, the CPU 231 transmits a room entry request to the support room URI received from the relay server 102.

If transmission of the room entry request completes, the CPU 231 advances the processing from step S704 to step S705. In step S705, step S707, and step S710, the CPU 231 enters a state of waiting for an instruction performed by an operator operating the keyboard 241 or the like, or a request transferred from the relay server 102.

In step S705, the CPU 231 determines whether or not it has accepted from an operator an instruction for disconnecting the connection (session) with the relay server, and advances the processing to step S706 in a case of having accepted a disconnection instruction, and advances the processing to step S707 in a case of having not accepted a disconnection instruction. In step S707, the CPU 231 determines whether or not a remote printer information request transmitted in accordance with a push transmission from the relay server 102 has been received. In a case of having received this request, the CPU 231 advances the processing to step S708, and in a case of having not received this request, the CPU 231 advances the processing to step S710. In step S710, the CPU 231 determines whether or not a remote printing request transmitted in accordance with a push transmission from the relay server 102 has been received. The CPU 231 advances the processing to step S711 in a case of having received the request, and returns the processing to step S705 and enters the waiting state again in a case of having not received the request.

In a case of having received a printer information request, the CPU 231, in step S708, obtains printer information for the printer which is set as a default printer, from the list of devices saved in the HDD 234. Note that, in the present embodiment, it is assumed that the image forming apparatus 104 is set as a default printer. As described above, the printer information is information relating to the printer driver 332 of the operator PC 103, and includes information indicating what kind of print setting can be made. Next, in step S709, the CPU 231 transmits the obtained printer information (remote printer information) to the relay server 102 as a response to the printer information request. Subsequently, the CPU 231 returns the processing to step S705, and enters the waiting state again.

In a case of having received a remote printing request, the CPU 231, in step S711, obtains the print data (image data and print settings) from the data field of the remote printing request. Furthermore, the CPU 231 uses the printer driver 332 to transmit a print command based on the obtained print data to the image forming apparatus 104 to thereby cause the image forming apparatus 104 to execute printing in accordance with the print command. Subsequently, in step S712, the CPU 231 transmits to the relay server 102 a notification indicating completion of transfer of print data to the image forming apparatus 104, as a response to the remote printing request. Subsequently, the CPU 231 returns the processing to step S705, and enters the waiting state again.

In a case of having accepted from the operator an instruction to disconnect the connection with the relay server 102, in step S706, the CPU 231 transmits a room exit request to the relay server 102. In accordance with this room exit request, the account corresponding to the operator PC 103 is deleted from the support room record held by the relay server 102, and the connection (session) between the operator PC 103 and the relay server 102 is disconnected. When transmission of the room exit request completes, the CPU 231 ends processing.

As described above, in the user PC 101 of the present embodiment, when using the remote support system, the communication processor 311 (the CPU 201) establishes a connection with the relay server 102 in order to undergo remote support by the operator PC 103. Furthermore, the communication processor 311 installs on the user PC 101 the virtual printer driver 312 for making a print instruction from the user PC 101 to the printer driver 332 of the operator PC 103. If a print instruction is made from the external application 313 to the virtual printer driver 312, print data is generated by the virtual printer driver 312 and outputted to the communication processor 311. The communication processor 311 transmits the print data generated by the virtual printer driver 312 to the operator PC 103, via the relay server 102, for printing by the printer driver 332. Subsequently, the communication processor 311 transmits a room exit request to the relay server 102 to thereby uninstall the virtual printer driver 312 from the user PC 101 in accordance with the connection with the relay server 102 being disconnected.

In this way, the user PC 101 of the present embodiment executes processing for uninstalling the virtual printer driver 312 (remote printer) in linkage with transmission of a room exit request to the relay server 102 (in accordance with the connection with the relay server 102 being disconnected). By this, it is possible to prevent the virtual printer driver 312 installed on the user PC 101 from remaining on the user PC 101 after the end of remote support. Accordingly, it is possible to prevent a user from mistakenly operating the virtual printer driver 312 after the end of remote support.

In addition, in the present embodiment, in the case where a setting for uninstalling the virtual printer driver 312 when the connection with the relay server 102 is disconnected is not made in advance, whether or not to uninstall the virtual printer driver 312 is confirmed with a user when the connection is disconnected. By this, even when a setting as described above is not made, it is possible to prompt a user for confirmation regarding uninstallation of the virtual printer driver 312. As a result, it is possible to prevent the virtual printer driver 312 from remaining on the user PC 101 in a state where it is not known by the user, after the end of remote support.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-169604, filed Sep. 4, 2017, which is hereby incorporated by reference herein in its entirety.

What is claimed is:

1. A first information processing apparatus operable to communicate, via a relay server, with a second information processing apparatus operable to perform remote support of an apparatus, the first information processing apparatus comprising:
   a memory storing instructions; and
   a processor executing the instructions causing the first information processing apparatus to:
   establish a connection with the relay server to receive the remote support by the second information processing apparatus;
   install on the first information processing apparatus a first printer driver for transmitting, from the first information processing apparatus, data to be a print target of a second printer driver of the second information processing apparatus;
   transmit data generated by the first printer driver to the second information processing apparatus via the relay server;
   perform a first setting for uninstalling the first printer driver when a connection with the relay server is disconnected; and
   in a case where the first setting is made, uninstall the first printer driver from the first information processing apparatus, in accordance with the connection with the relay server being disconnected.

2. The first information processing apparatus according to claim 1, wherein the processor executes the instructions causing the first information processing apparatus to:
   in a case where the first setting is not made, confirm with a user whether or not to uninstall the first printer driver when the connection with the relay server is disconnected, and
   in the case where the first setting is not made, uninstall the first printer driver in accordance with a result of the confirmation.

3. The first information processing apparatus according to claim 2, wherein the processor executes the instructions causing the first information processing apparatus to:
   perform a second setting for confirming with a user whether or not to uninstall the first printer driver each time a connection with the relay server is disconnected, and
   in a case where the second setting is made, confirm with a user whether or not to uninstall the first printer driver.

4. The first information processing apparatus according to claim 1, wherein the processor executes the instructions causing the first information processing apparatus to install the first printer driver after the connection with the relay server is established.

5. The first information processing apparatus according to claim 1, wherein the processor executes the instructions causing the first information processing apparatus to, when a print instruction with respect to the first printer driver is performed, transmit data to the second information processing apparatus in response to a user permitting transmission of the data to the second information processing apparatus.

6. A method executed in a first information processing apparatus operable to communicate, via a relay server, with a second information processing apparatus operable to perform remote support of an apparatus, the method comprising:
   establishing a connection with the relay server to receive the remote support by the second information processing apparatus;
   installing on the first information processing apparatus a first printer driver for transmitting, from the first information processing apparatus, data to be a print target of a second printer driver of the second information processing apparatus;
   transmitting data generated by the first printer driver to the second information processing apparatus via the relay server;
   performing a first setting for uninstalling the first printer driver when a connection with the relay server is disconnected; and
   in a case where the first setting is made, uninstalling the first printer driver from the first information processing apparatus, in accordance with the connection with the relay server being disconnected.

7. A non-transitory computer readable storage medium on which is stored a computer program for making a computer execute a method in a first information processing apparatus operable to communicate, via a relay server, with a second information processing apparatus operable to perform remote support of an apparatus, the program comprising code to execute:

establishing a connection with the relay server to receive the remote support by the second information processing apparatus;

installing on the first information processing apparatus a first printer driver for transmitting, from the first information processing apparatus, data to be a print target of a second printer driver of the second information processing apparatus;

transmitting data generated by the first printer driver to the second information processing apparatus via the relay server;

performing a first setting for uninstalling the first printer driver when a connection with the relay server is disconnected; and in a case where the first setting is made, uninstalling the first printer driver from the first information processing apparatus, in accordance with the connection with the relay server being disconnected.

* * * * *